United States Patent

Fukuda et al.

[11] Patent Number: 6,078,430
[45] Date of Patent: Jun. 20, 2000

[54] OPTICAL LENS AND METHOD OF MAKING THE SAME

[75] Inventors: Masaaki Fukuda; Takashi Ito, both of Saitama, Japan

[73] Assignee: Fuji Photo Optical Co., Ltd., Saitama, Japan

[21] Appl. No.: 09/045,795

[22] Filed: Mar. 23, 1998

[30] Foreign Application Priority Data

Mar. 28, 1997 [JP] Japan .................................. 9-078528

[51] Int. Cl.⁷ .............................. G02B 3/00; G02B 13/18
[52] U.S. Cl. ............................................ 359/642; 359/719
[58] Field of Search ...................................... 359/642, 719

[56] References Cited

U.S. PATENT DOCUMENTS 5,905,599 5/1999 Nomura et al. ......................... 359/819

*Primary Examiner*—Scott J. Sugarman
*Attorney, Agent, or Firm*—Leydig, Voit & Mayer

[57] ABSTRACT

An optical lens and method of making the optical lens including a substantially arc-shaped cutting surface on a flange section for easily removing a gate section by cutting. A flange section is located at an outer periphery of an optically functioning section and the substantially arc-shaped cutting surface is located at an outer peripheral portion of the flange section along a circumferential direction of the flange section.

6 Claims, 5 Drawing Sheets

PRIOR ART

OPTICAL LENS AND METHOD OF MAKING THE SAME

BACKGROUND OF THE INVENTION

1. Field of the Invention

The present invention relates to an optical lens used in optical devices and the like, and a method of making the optical lens.

2. Related Background Art

Conventionally known is an optical lens A, as shown in FIG. 7, comprising an optically functioning section B formed at its center part and a flange section C formed at the outer periphery of the optically functioning section B. The flange section C is mainly provided for attachment of the optical lens A.

Such optical lens A is made by charging a resin into a die and injecting the resin into a cavity (hollow portion), which is formed within the die, through a gate. As a result, after molding, as shown in FIG. 7, a gate section F and the flange section C of the optical lens A are in a continuous state. Accordingly, making the optical lens A necessitates a process of separating the gate section F from the optical lens A. Since this separating process for the gate section F is difficult, there has been a demand for developing a technique for easily cutting off the gate section F.

SUMMARY OF THE INVENTION

As shown in FIG. 8, the inventor has designed, as a method of separating the gate section F from the optical lens A, a method in which a part of the flange section C is cut off together with the gate section F. In the case where the flange section C is thus linearly severed so as to cut off the gate section F, even when a burr is generated at the cutting surface of the flange section C, the burr would not project to the outer peripheral portion of the optical lens A. Consequently, the burr at the cutting surface can be prevented from obstructing the attachment of the optical lens A.

This method of separating the gate section F, however, may have shortcomings as follows. For example, in the case where, due to the smaller size of the optical lens A and the like, the width G of the flange section C becomes very small and the width H of the gate section F increases with respect to the radius D of the flange section C along the circumferential direction of the latter; in order to completely separate the gate section F from the optical lens A, it is necessary to cut off the proximity of the optically functioning section B as shown in FIG. 9. Consequently, there is a possibility of the optically functioning section B being cut off due to a slight shift in the cutting position. Accordingly, strict processing accuracy is required for the cutting process, thus still leaving it difficult.

In order to solve the foregoing problems, it is an object of the present invention to provide an optical lens and method of making the same in which the gate section can be easily cut off.

In order to achieve such an object, the optical lens in accordance with the present invention is an optical lens comprising an optically functioning section and a flange section formed at an outer periphery thereof, in which a substantially arc-shaped gate cutting surface is formed at an outer peripheral portion of the flange section along a circumferential direction thereof. Also, in the optical lens in accordance with the present invention, the optically functioning section and the flange section may be formed by resin molding.

As a result of these configurations, when cutting off the gate section continuous with the flange section upon manufacture, even in the case where the width of the flange section is small and the like, a part of the flange section can be cut off so that gate section is separated, without cutting off the optically functioning section. Consequently, the optical lens can be made securely and easily.

In the optical lens in accordance with the present invention, the flange section may be provided with a gate indicating section for indicating a gate position.

In this configuration, even when the gate cutting surface is shaped like an arc and thus its existence is hard to recognize, a gate position upon manufacture, i.e., position for injecting a resin or the like, can be clearly recognized from the gate indicating section. Consequently, optical properties of the optically functioning section which depend on the injecting direction of the resin or the like can be grasped correctly.

The method of making an optical lens in accordance with the present invention is a method of making an optical lens comprising an optically functioning section and a flange section formed at an outer periphery thereof, the method comprising the steps of forming, by molding, a molded article in which a gate section is continuous with the flange section of the optical lens; and separating the gate section from the optical lens by cutting off, substantially in an arc shape, a part of the flange section along an outer periphery thereof.

In this method, when separating the gate section from the flange section continuous therewith, a part of the flange section can be securely cut off so that the gate section is separate, without cutting off the optically functioning section. Consequently, even in the case where the flange section has a small width and the like, the optical lens can be made securely and easily.

In the method of making an optical lens in accordance with the present invention, a gate indicating section indicating a gate position may be formed simultaneously when the molded article is formed.

In this case, even when the gate cutting surface is shaped like an arc and thus its existence is hard to recognize, a gate position upon manufacture, i.e., position for injecting a resin or the like, can be clearly recognized from the gate indicating section. Consequently, optical properties of the optically functioning section which depend on the injecting direction of the resin or the like can be grasped correctly.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
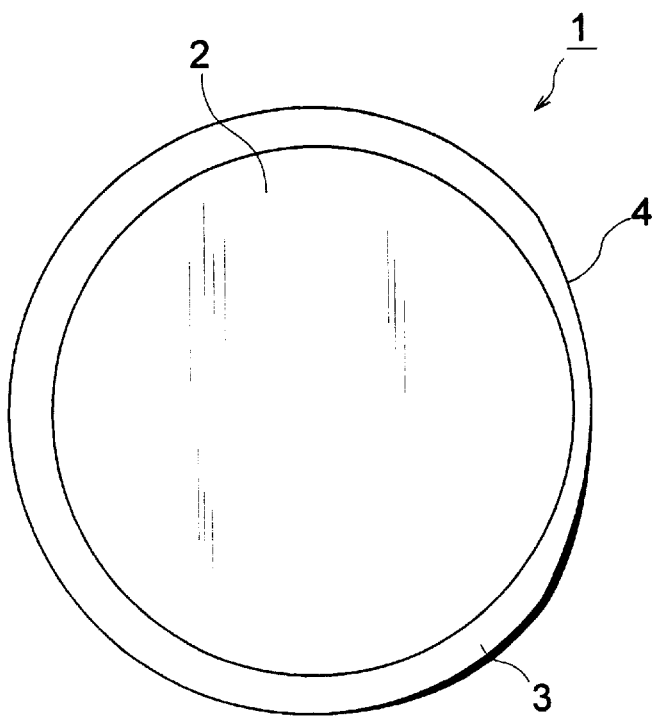
FIG. 1 is a perspective view of an optical lens in accordance with a first embodiment.

In the following, various embodiments of the present invention will be explained with reference to the accompanying drawings. Among the drawings, constituents identical to each other will be referred to with numerals or letters identical to each other, without repeating their explanations. Here, the sizes and proportions in the drawings do not always coincide with those explained.

First Embodiment

FIG. 1 is an explanatory view of an optical lens in accordance with this embodiment. In FIG. 1, an optical lens 1 comprises an optically functioning section 2 and a flange section 3 formed at an outer periphery thereof. The optically functioning section 2 is a part functioning as an optical lens and has a disc-like shape, for example. The flange section 3 is disposed mainly for attaching the optical lens 1 to a holder or the like, and is integrally molded with the optically functioning section 2 by a resin or the like. Not only the resin but also glass or the like may be employed as the material for constituting the optical lens 1. While having an annular shape in the optical lens 1 shown in FIG. 1, the flange section 3 is not restricted to such a shape as long as it is formed at the outer periphery of the optically functioning section 2. For example, it may be formed at a part of the outer periphery of the optically functioning section 2.

As shown in FIG. 1, the outer peripheral portion of the flange section 3 is provided with a gate cutting surface 4. The gate cutting surface 4 is formed by removing, substantially in an arc shape, a part of the outer peripheral portion of the flange section 3 along its circumferential direction, thereby yielding a substantially arc-like form along the outer periphery of the flange section 3. Preferably, the gate cutting surface 4 has a radius of curvature at least greater than the radius of outer periphery of the flange section 3. The outer peripheral surface of the flange section 3 other than the gate cutting surface 4 functions as a reference surface which becomes a reference for attachment of the optical lens 1. Since the gate cutting surface 4 is formed inside of the other outer peripheral surface of the flange section 3 (i.e., closer to the center of the optically functioning section 2); even when a burr formed upon cutting projects from the gate cutting surface 4, it would not obstruct attachment of the optical lens 1. Though the gate cutting surface 4 is preferably a completely arc-shaped or smoothly arc-shaped surface, it may be substantially arc-shaped as well. For example, it may be a surface which is approximately shaped like an arc by lines linked to each other.

In such optical lens 1, upon manufacture thereof, the flange section 3 is cut off in an arc shape along the outer peripheral portion thereof, whereby the gate cutting surface 4 is formed. Consequently, even in the case where the width of the flange section 3 (width of the flange section 3 in the optical lens diameter direction) is small, a part of the flange section 3 can be cut off so that a gate section is securely separated, without cutting off the optically functioning section 2. Accordingly, the optical lens 1 can be manufactured securely and easily.

In the following, a method of making the optical lens 1 will be explained.

Figure 2:
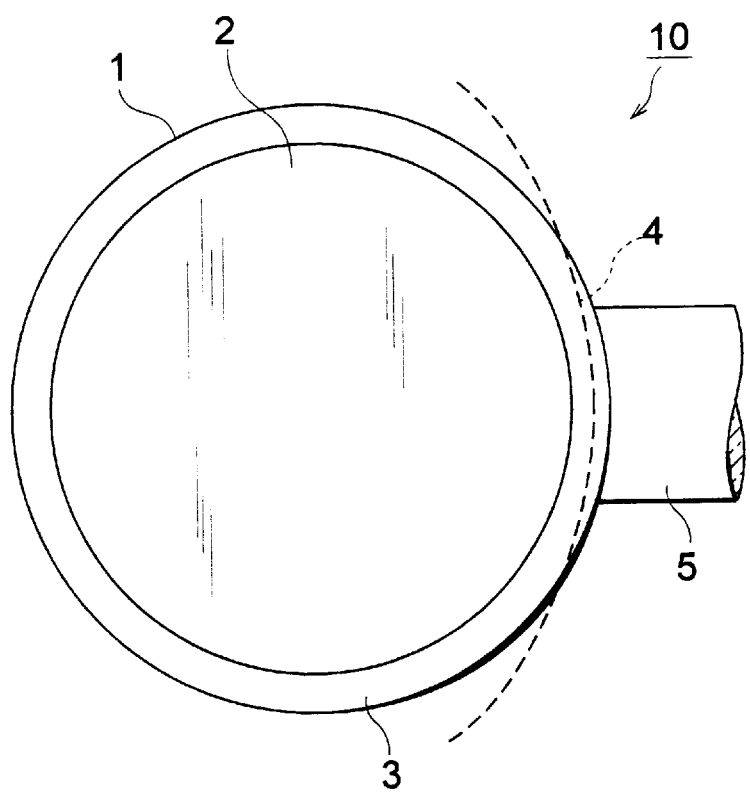
FIG. 2 is an explanatory view of a process of making the optical lens in accordance with the first embodiment.

FIG. 2 is an explanatory view of a process of making the optical lens 1. When making the optical lens 1, at first, a molded article 10 comprising the optical lens 1 and a gate section 5 continuous therewith is formed. Namely, a resin is charged into a die, and the resin is injected into a cavity (hollow portion) which conforms to the outer shape of the optical lens 1. Here, in the die, a gate which becomes an opening for injecting the resin or the like into the cavity is formed at its inner wall portion which becomes the outer peripheral surface of the flange section 3 of the optical lens 1. As the molding method, injection molding or the like may be employed with a material such as resin, glass, or the like.

When the molded article 10 within the cavity is solidified, the former is taken out from the latter. As shown in FIG. 2, the molded article 10 is in a state where the gate section 5 is united and continuous with the flange section 3 of the optical lens 1. Then, the gate section 5 is separated from the optical lens 1. In this separating operation, an end mill or the like is used for cutting off a part of the flange section 3. Here, "cutting off" also encompasses the case where a part of the flange section is shaved off.

This cutting operation is effected such that the gate cutting surface 4 substantially attains an arc shape along the outer periphery of the flange section 3 as indicated by the dotted line in FIG. 2. For example, a machining device such as an end mill is set by a numerically controlled machine tool so as to move like an arc with respect to the molded article 10, and the flange section 3 is cut off in conformity to the locus of movement of the machining device. Here, without being restricted to a completely arc-shaped locus, the movement of the machining device may have a substantially arc-shaped locus as well. For example, the machining device may be moved linearly while changing its moving direction appropriately, so that it is moved approximately in an arc shape. Here, "substantially arc-shaped" also encompasses an arc forming a part of an ellipse and the like.

In such a cutting operation, even when the flange section in the optical lens 1 to be made has a small width or when he gate section 5 in the molded article 10 has a large width, a part of the flange section 3 can be cut off so that the gate section 5 is completely separated from the optical lens 1, without cutting off the optically functioning section 2. Also, this cutting operation does not necessitate any strict processing accuracy in which the cutting locus is made flush with the outer peripheral portion of the flange section 3. As a result, the operation for cutting off the gate section 5 can be effected easily. Such a cutting operation for the gate section 5 is very effective in the cases where the diameter of the optical lens 1 is not greater than 6 mm, where the width of the flange section 3 is not greater than 1 mm, and the like. The manufacture of the optical lens 1 is completed after the gate section 5 is separated from the optical lens 1.

As mentioned above, in the optical lens 1 or method of making the same in accordance with this embodiment, even when the flange section 3 has a small width or when the broad gate section 5 is continuous therewith, the gate section 5 can be separated securely and easily without cutting off the optically functioning section 2. Accordingly, the efficiency in making the optical lens 1 can be improved.

Second Embodiment

In the following, an optical lens and method of making the same in accordance with a second embodiment will be explained.

Figure 3:
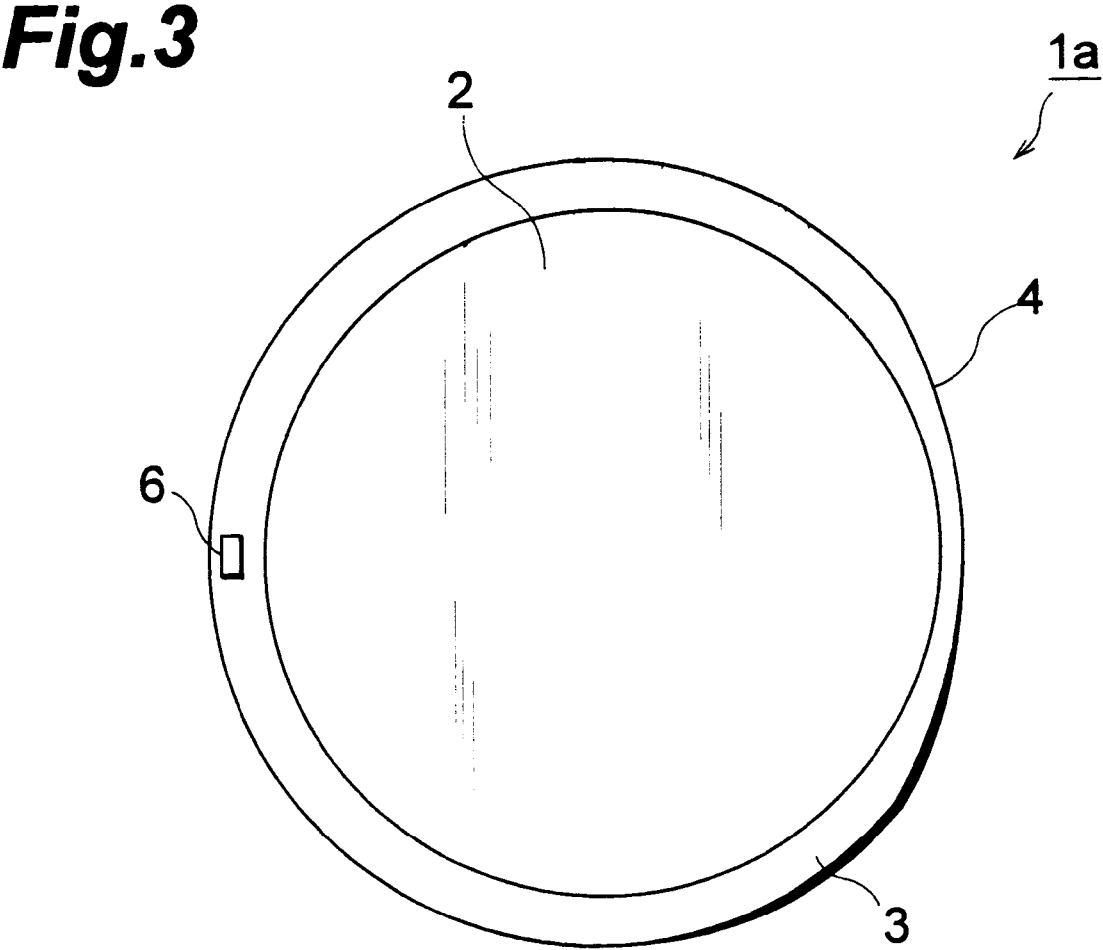
FIG. 3 is an explanatory view of an optical lens in accordance with a second embodiment.
Figure 4:
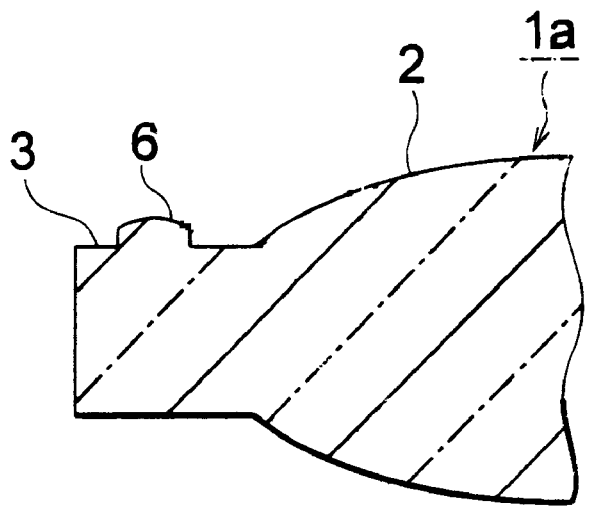
FIG. 4 is an explanatory view of the optical lens in accordance with the second embodiment.

FIG. 3 shows an optical lens 1a in accordance with this embodiment. As shown in this drawing, the optical lens 1a has a configuration substantially similar to that of the optical lens 1 in accordance with the first embodiment, while its flange section 3 is provided with a gate indicating section 6. The gate indicating section 6 is used for indicating a gate position when the optical lens 1a is made. Since the gate indicating section 6 is made, the position for injecting the resin or the like upon molding can be recognized easily. In particular, when the gate cutting surface 4 is shaped like an arc, whereby the existence of the gate cutting surface 4 tends to become unclear, the gate indicating section 6 functions effectively. For example, the gate indicating section 6 is constituted by a protrusion disposed on the surface of the flange section 3 as shown in FIG. 4. Preferably, the gate indicating section 6 is formed at a position where the gate position upon manufacture, i.e., the position of the gate cutting surface 4, is easily discernible. For example, as shown in FIG. 3, it is positioned so as to be symmetrical to the gate cutting surface 4. Nevertheless, the gate indicating section 6 may be formed at any other position as long as the position where the gate cutting surface 4 is formed can be recognized.

Figure 5:
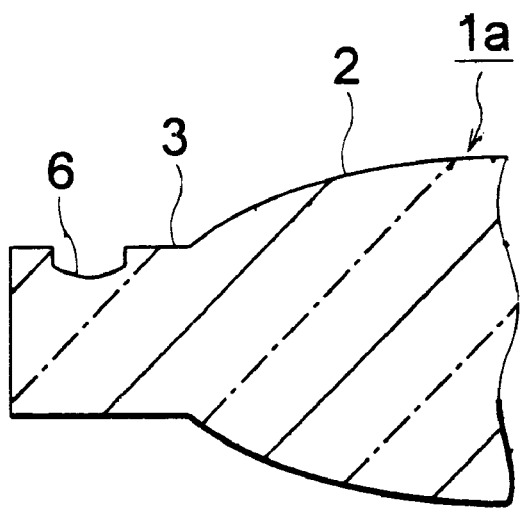
FIG. 5 is an explanatory view of the optical lens in accordance with the second embodiment.

Also, as shown in FIG. 5, the gate indicating section 6 can be formed as a depression on the flange section 3. The gate indicating section 6 functions to indicate the gate position in this case as well. Though the gate indicating section 6 is formed like a rectangle in the optical lens 1a shown in FIG. 3, its form may also be circular, polygonal, or the like. Further, a part of the flange section 3 may be cut out to form the gate indicating section 6.

Figure 6:
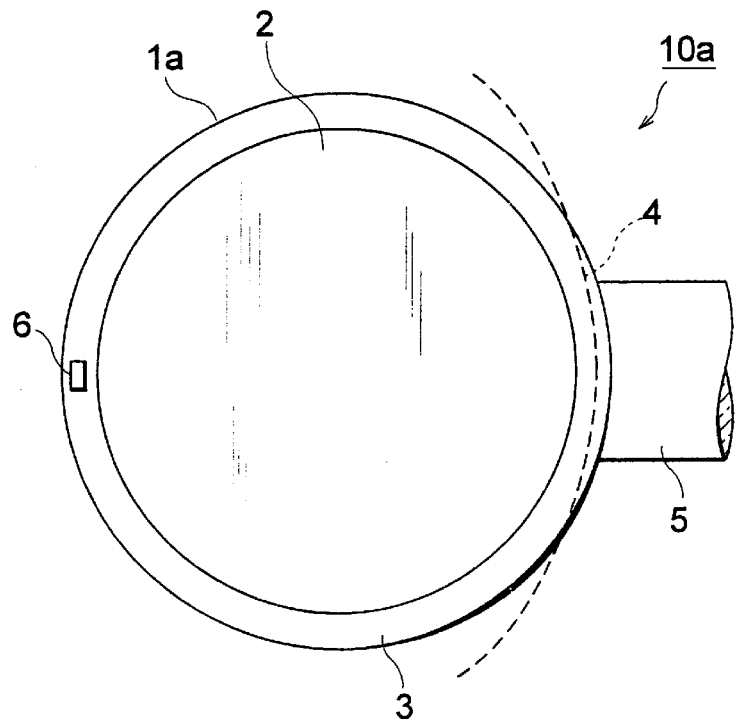
FIG. 6 is an explanatory view of a process of making the optical lens in accordance with the second embodiment.
Figure 7:
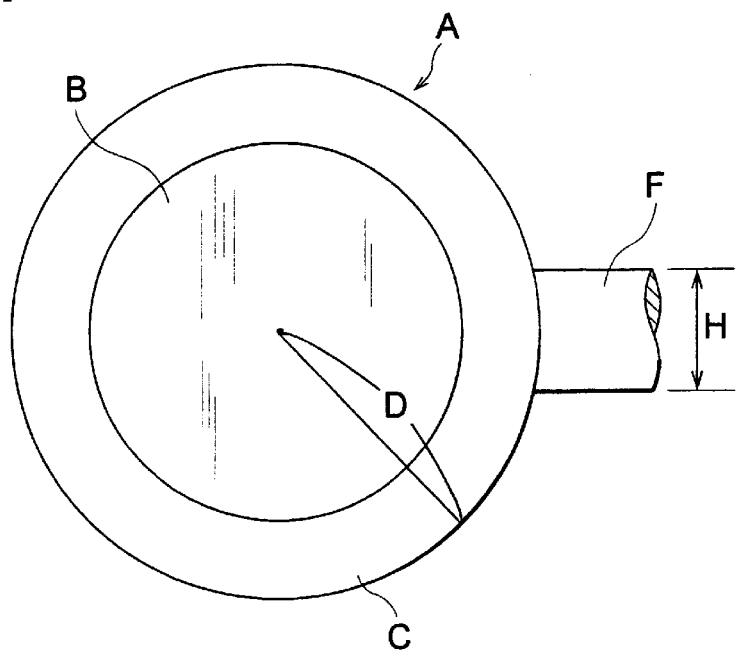
FIG. 7 is an explanatory view of prior art.
Figure 8:
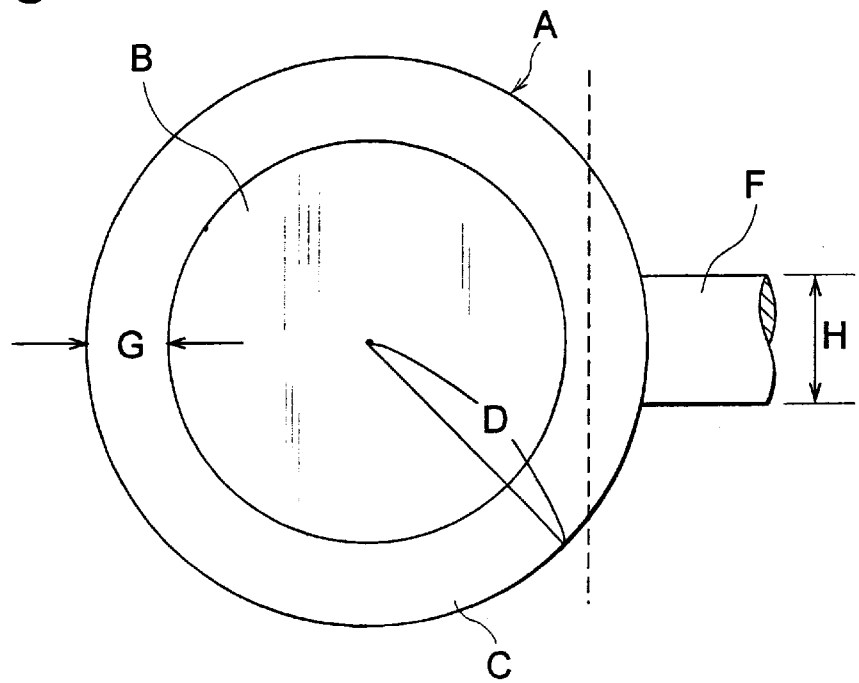
FIG. 8 is an explanatory view of background art for the present invention.
Figure 9:
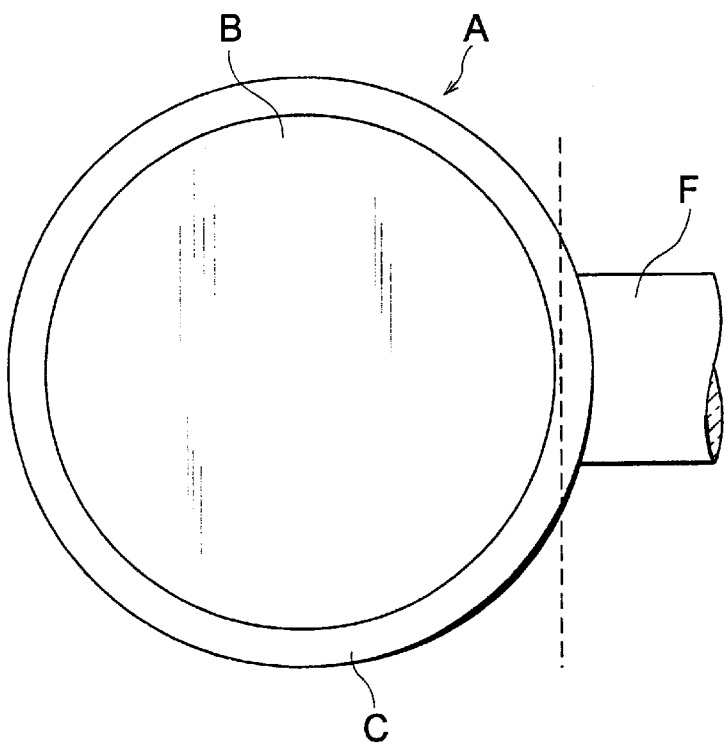
FIG. 9 is an explanatory view of background art for the present invention.

As shown in FIG. 6, the optical lens 1a may be manufactured in a manner substantially similar to that of the optical lens 1. Namely, after a molded article 10a comprising the optical lens 1a and the gate section 5 continuous therewith is formed, the gate section 5 is separated from the optical lens 1a. The gate indicating section 6 may be formed at the same time when the molded article 10a comprising the optically functioning section 2, flange section 3, and the like is integrally molded.

In such optical lens 1a, the position for injecting the resin or the like upon manufacture can be easily seen from the gate indicating section 6 of the flange section 3. Consequently, optical properties of the optically functioning section 2 which depend on the injecting direction of the resin or the like can be grasped correctly, thus allowing the optical properties of the optical lens 1a to be utilized effectively.

Thus, the optical lens 1a and method of making the same in accordance with this embodiment can yield, in addition to the effects of the optical lens 1 in accordance with the first embodiment mentioned above, advantages in that the position for injecting the resin or the like upon manufacture can be easily recognized from the optical lens 1a due to the existence of the gate indicating section, whereby optical properties of the optically functioning section which depend on the injecting direction of the resin or the like can be grasped correctly.

As explained in the foregoing, the present invention can yield the following effects.

Namely, when the gate section continuous with the flange section is cut off upon manufacture, even in the case where the flange section has a small width, a part of the flange section can be cut off so that the gate section is separated, without cutting off the optically functioning section. Accordingly, the optical lens can be manufactured securely and easily.

Also, when a gate indicating section is formed, the position for injecting a resin or the like upon manufacture is clarified, whereby optical properties of the optically functioning section which depend on the injecting direction of the resin or the like can be grasped correctly.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical lens comprising:

an optically functioning section; and a flange section located at an outer periphery of said optically functioning section, wherein a substantially arc-shaped gate cutting surface is located at an outer peripheral portion of said flange section along a circumferential direction of said flange section.

2. The optical lens according to claim 1, wherein said optically functioning section and said flange section are molded resin.

3. The optical lens according to claim 1, wherein said flange section includes a gate indication section for indicating a gate position.

4. The optical lens according to claim 2, wherein said flange section includes a gate indication section for indicating a gate position.

5. A method of making an optical lens comprising an optically functioning section and a flange section located at an outer periphery of said optically functioning section, the method comprising:

forming, by molding, a molded article having a gate section continuous with said flange section of said optical lens; and separating said gate section from said optical lens by cutting off, substantially in arc-shape, a part of said flange section along an outer periphery of said flange section.

6. The method according to claim 5 including forming a gate indicating section for indicating a gate position in said flange section when forming, by molding, said molded article.

* * * * *